United States Patent [19]
Mizuno et al.

[11] Patent Number: 5,372,616
[45] Date of Patent: Dec. 13, 1994

[54] BIN FOR MUSHROOM CULTURE

[75] Inventors: Masayuki Mizuno; Katsuji Yamanaka; Satosi Inatomi; Kenji Namba, all of Nagano, Japan

[73] Assignee: Hokuto Corporation, Naganoken, Japan

[21] Appl. No.: 138,265

[22] Filed: Oct. 20, 1993

[30] Foreign Application Priority Data

Oct. 28, 1992 [JP] Japan .................................. 4-313988
Dec. 28, 1992 [JP] Japan .................................. 4-360586

[51] Int. Cl.$^5$ .......................... A01G 1/04; C12M 1/24; C12M 1/22; C12M 1/12
[52] U.S. Cl. ..................................... 47/1.1; 435/296; 435/298; 435/311
[58] Field of Search ................. 47/1.1, 1.102, 1.107; 435/296, 297, 298, 311

[56] References Cited

U.S. PATENT DOCUMENTS 4,528,783  7/1985  Muir ..................................... 52/573
4,670,398  6/1987  Song .................................... 435/298

FOREIGN PATENT DOCUMENTS 62-91945    6/1987   Japan .
3-27402     6/1991   Japan .
2048037A   12/1980   United Kingdom .......... A01G 1/04

OTHER PUBLICATIONS

Edwards, R. L. (1978) The Biology and Cultivation of Edible Mushrooms, (Eds, Chang and Hayes) Academic Press, N.Y. pp. 321–327.

Primary Examiner—David T. Fox
Assistant Examiner—Elizabeth F. McElwain

[57] ABSTRACT

A bin for mushroom culture for cultivating mushrooms such as shiitake that comprises upper half bin 2 and lower half bin 3 so arranged as to be able to elongate and contract by sliding upward and downward when fitted. Fitting part C of upper half bin 2 and lower half bin 3 is so arranged as to form a ventilating route F connecting the inside and outside at an elongated position P2 compared with the most contracted position P1. Thereby, ventilation is performed through ventilating route F and carbon dioxide, which is heavier than air, is exhausted.

4 Claims, 3 Drawing Sheets

BIN FOR MUSHROOM CULTURE

BACKGROUND OF THE INVENTION

1. Field of the Invention

The present invention relates to a bin for the culture of mushroom that is suitably used for cultivating mushrooms such as shiitake (*Lentinus edodes* (Berk.) Sing.).

2. Description of the Relevant Art

The growth stage of mushrooms in a bed cultivation generally comprises vegetative growth and reproductive growth. At the cultivation step of the vegetative growth, holes are provided for inoculation of the substrate which is filled in the bin for culture; mushroom spawn are inoculated in these holes and in a culture room; hyphae are allowed to spread into substrate in the bin for culture that are capped for preventing miscellaneous harmful fungi from entering. On the other hand, at the reproductive growth step, the substrate is taken out and only the removed mushroom culture medium is placed in the culture bin for growing in a growth room. The bin for culture are composed divided in the upper half bin and lower half bin; both can be attached and detached by a screw mechanism so that the substrate can be taken out during the growing process.

In the culture process of hyphae, enough ventilation into the bin for culture is required in order to exhaust a large volume of generated carbon dioxide while it is necessary to prevent harmful fungi from entering. Poor ventilation in the culture bin may obstruct breathing of the hyphae and their efficient propagation, thereby making the cultivation period longer and deteriorating the mushroom quality.

In view of this, conventionally, a permeable cap was fitted to the mouth provided to the culture bin to ventilate inside the bin. Among known caps for this purpose, for example, Japanese Utility Model Publication No. 27402/'91 (Hei-3) has proposed a cap for culture bin that has a zigzag air flow path in the cap body whereby the internal part of the culture bin communicates with the outside when the cap is fitted to the bin; Japanese Utility Model Provisional Publication No. 91945/'87 (Sho-62) has disclosed a cap for a culture bin that has an open part and a ventilating part in the cap body, both parts being covered with permeable material under which absorbents of carbon dioxide are accommodated.

However, these known caps have been unsatisfactory for adequate and efficient ventilation because: the ventilation is secured only through a cap located at the bin mouth of the bin for culture; the ventilation is made through permeable material provided on the cap but is not satisfactory from the viewpoint of permeability; and carbon dioxide is heavier than air. The breathing activity is highest in the cultivating step, when the substrate swells by the hyphae's spread during the whole cultivation process, and carbon dioxide tends to accumulate in the bin.

SUMMARY OF THE INVENTION

An object of the present invention is to provide a bin for mushroom culture that makes it possible to afford adequate and efficient ventilation to increase the mushroom harvest and shorten the ventilation period while preventing miscellaneous fungi from entering. Another object of the present invention is to provide a bin for mushroom culture that improves the quality of the product mushroom after the harvest by way of accelerating vaporization of water and dissipation of moisture whereby the generation of so-called watery mushrooms is prevented and natural cultivation atmosphere is created during the spawn run.

For attaining these objects, the present invention provides a bin for mushroom culture that comprises attachable and detachable upper half bin 2 and lower half bin 3 and accommodates therein culture medium S for mushroom culture characterized in that: upper half bin 2 and lower half bin 3 are so arranged as to be able to elongate and contract by sliding upward and downward when fitted; and that fitted part C is so arranged as to close at the most contracted position P1 and form ventilating route F connecting inside and outside at an elongated position P2 compared with the most contracted position P1. In this case, ventilating route F is arranged in a zigzag formed by a plurality of linear protrusions $4p$, $4q$, $4r$—fabricated onto upper half bin 2 or lower half bin 3. Preferable molding material for culture bin 1 is a synthetic resin such as polypropylene containing silicone 0.1 to 2 percent by weight.

With these arrangements, upper half bin 2 and lower half bin 3 are attachable and detachable and form, when attached, culture bin 1 of one body that accommodates mushroom culture medium S therein to cultivate hyphae and when they are separated the internal mushroom culture medium S may be removed to the outside: these are fundamental functions of bin 1 for mushroom culture.

Immediately after the hyphae spread on the whole substrate, the substrate in culture bin during the spawn run forms a film on the surface of the substrate block and the entire culture medium expands to a significant extent. Therefore, in a conventional culture bin of a constant volume, free spreading of the hyphae is physically prevented. According to the present invention, upper half bin 2 and lower half bin 3 are fitted so as to be able to elongate and contract by sliding upward and downward; therefore, by contracting the culture bin 1 at the beginning, culture bin 1 elongates and increases in volume as culture medium S expands.

Fitted part C of upper half bin 2 and lower half bin 3 is closed at the most contracted position P1 and forms ventilating route F connecting inside and outside at an elongated position P2 compared with the most contracted position P1; thus, the culture bin 1 is maintained shut tight, from inoculation of the spawn until substrate S begins to expand caused by the spread of hyphae to the block surface and the entrance of harmful fungi is completely shut off accordingly. On the other hand, when spreading of hyphae progresses to a certain extent and the substrate S begins to expand, ventilation route F is automatically formed at fitted part C of upper half bin 2 and lower half bin 3. In this case, the ventilation route to the inside of the culture bin 1 includes ventilating route F in addition to the conventional cap; thereby effective ventilating area is increased and two ventilating routes are secured in different places. Since ventilating route F is formed in a zigzag shape by a plurality of linear protrusions $4p$, $4q$, $4r$—, the entrance of harmful fungi into culture bin 1 is prevented.

When a synthetic resin such as polypropylene containing silicone 0.1 to 2 percent by weight is used as the molding material of culture bin 1, fine silicone particles are uniformly dispersed throughout the synthetic resin making the friction resistance of the bin surface significantly reduced and improving the elasticity and heat-resistance as well. As a result, sliding of upper half bin 2 and lower half bin 3 becomes smooth and reliable and removal of the substrate S also becomes smooth; in addition, the bin surface is difficult to be soiled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
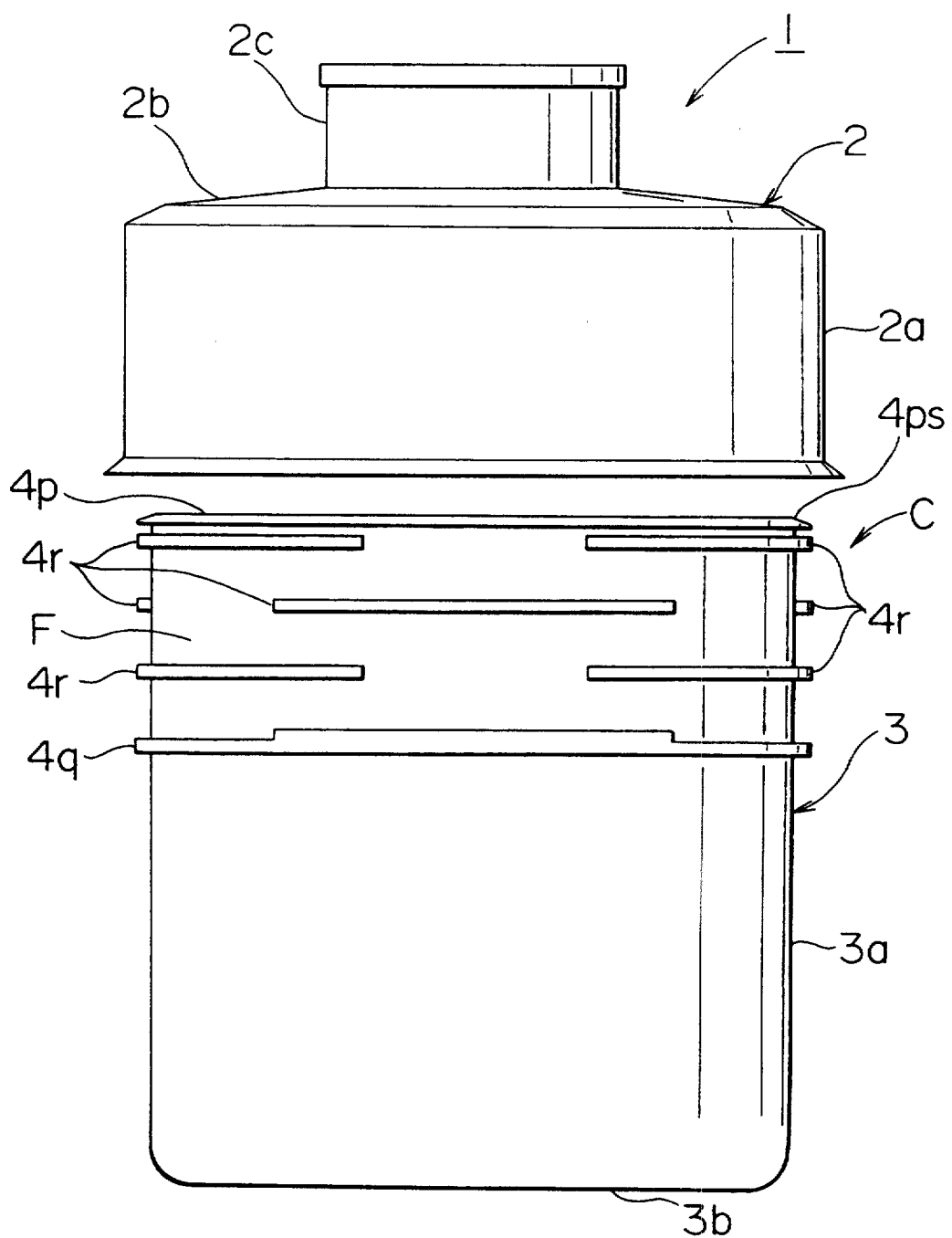
FIG. 1 is a front view of a bin for mushroom culture in detached condition according to the present invention.

Now, the present invention is explained in detail for the preferred embodiments referring to the drawings.

Figure 2:
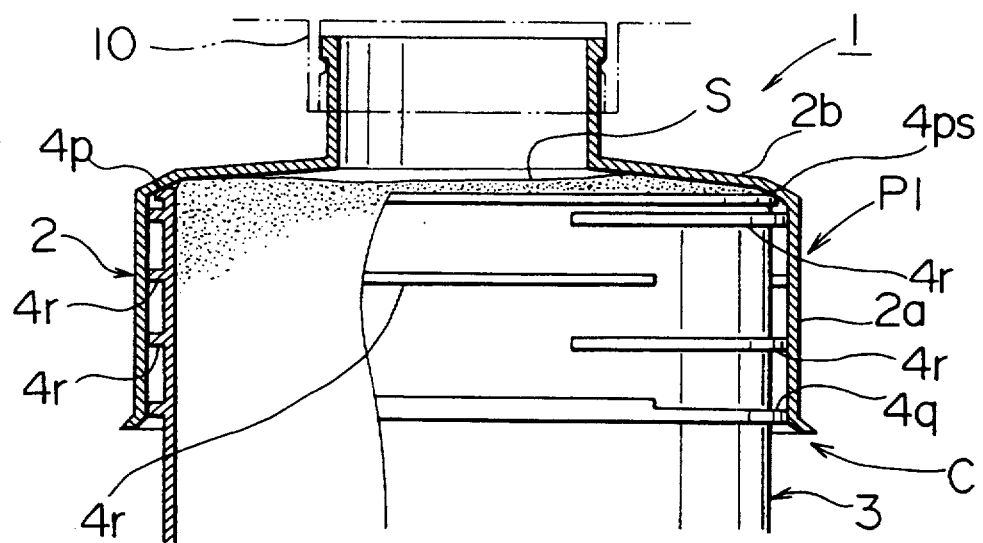
FIG. 2 is a partially exploded view of a bin for mushroom culture used at the most contracted position according to the present invention.
Figure 3:
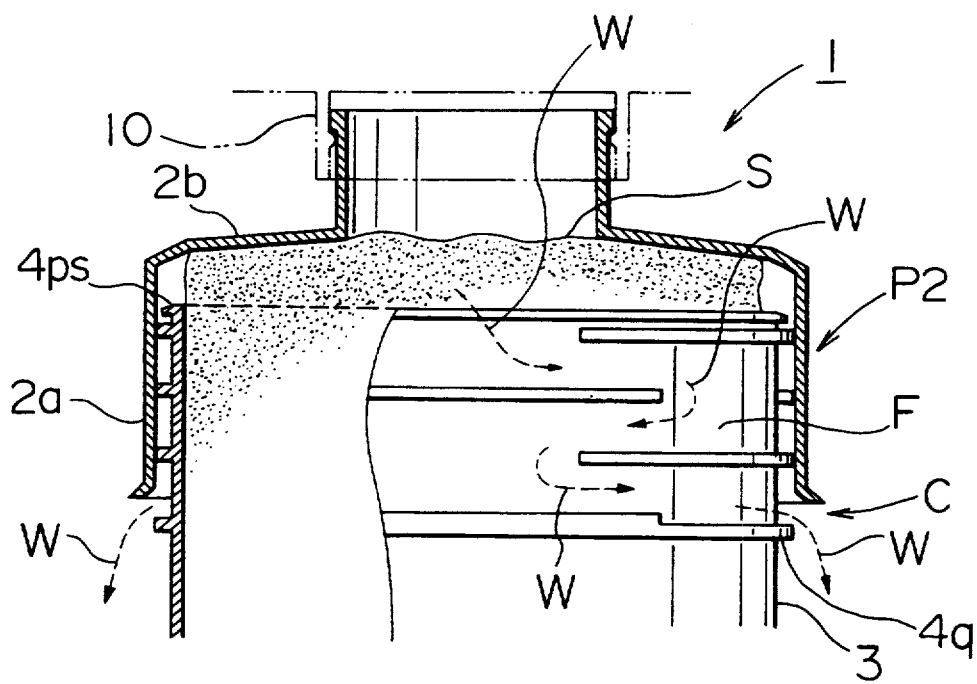
FIG. 3 is a partially exploded view of a bin for mushroom culture used at an elongated position according to the present invention.

At first, arrangement of the bin culture according to the present embodiment, for mushroom culture is explained referring to FIGS. 1 through 3.

Bin 1 for mushroom culture comprises upper half bin 2 and lower half bin 3 in the form of the whole bin being divided in two.

Upper half bin 2 comprises cylindrical part 2a, upper end surface part 2b provided at the upper edge of cylindrical part 2a and somewhat inclined upward to the center, and bin mouth 2c in the form of small cylinder provided at the center of upper end surface part 2b; the whole body is molded in one body.

While various synthetic resins may be used as the molding material, it is desirable to use polypropylene containing silicone (silicone oil) in an amount of 0.1 through 2 percent by weight, most preferably 0.5 through 1 percent by weight. Thereby, fine silicone particles are uniformly dispersed throughout the synthetic resin, which significantly reduces the friction resistance of the bin surface and improves the elasticity and heat-resistance as well. As a result, sliding of upper half bin 2 and lower half bin 3 becomes smooth and reliable and taking out the substrate S also becomes smooth; in addition, the bin surface becomes difficult to be soiled.

On the other hand, lower half bin 3 comprises cylindrical part 3a, and bottom surface part 3b provided at the lower edge of cylindrical part 3a; and the whole is molded in one body. The molding material employed is the same as that used for upper half bin 2. On the outer surface, in the upper half, of cylindrical part 3a, a plurality of linear protrusions 4p, 4q, 4f are integrally formed. That is, at the upper edge and the middle parts in the outer surface of cylindrical part 3a there are provided with ring-like linear protrusions 4p and 4q along the whole periphery respectively; between the linear protrusions 4p and 4q, ventilating route F in a zigzag form is provided by a plurality of linear protrusions 4r—arranged intermittently along the peripheral direction. The width of protrusion of linear protrusion 4p is made less than those of other protrusions 4q, 4r—; the upper surface has inclined surface 4ps which face-contacts the inner surface of upper end surface part 2b.

Now, function of bin 1 for mushroom culture is explained together with sizes of respective parts and their positional relationship. The inner surface of upper half bin 2 can be fitted, freely attachable and detachable, to the outer surface of the upper half of lower half bin 3. When attached, upper half bin 2 and lower half bin 3 are able to elongate and contract by sliding upward and downward; respective linear protrusions 4p, 4q, 4r—prepared on lower half bin 3 abut against (under pressure) the inner surface of cylindrical part 2a or upper end surface part 2b of upper half bin 2. As for fitted part C of upper half bin 2 and lower half bin 3 when located at the most contracted position P1 shown in FIG. 2, that is, the position where lower half bin 3 is pushed into upper half bin 2 to the maximum extent, inclined surface 4ps of linear protrusion 4p face-contacts the inner surface of upper end surface part 2b while linear protrusion 4q abut (under pressure) against the inner surface of cylindrical part 2a of upper half bin 2 to completely shut tight the culture bin 1.

On the other hand, at an elongated position P2 shown in FIG. 3 (the position more elongated than the most contracted position P1), inclined surface 4ps of linear protrusion 4p separates from the inner surface of upper end surface part 2b and only linear protrusions 4r—are abutted against the inner surface of cylindrical part 2a. In this way, ventilating route F formed at fitted part C of upper half bin 2 and lower half bin 3 becomes opened at upper and lower ends; thus, the inside and outside of culture bin 1 are communicated through ventilating route F and inside carbon oxide is exhausted to outside through ventilating route F (see symbol W in FIG. 3).

Therefore, during the culture process, the substrate S is filled into culture bin 1 integrated with the fitting while shutting tight culture bin 1 at the most contracted position P1. Then, holes for inoculation are opened and filled with the substrate S and the spawn is inoculated in the holes while cap 10, explained later, is fitted to bin mouth 2c to prevent various fungi from entering and allowing the hyphae to spread in the culture room. In this case entrance of harmful microorganisms into culture bin 1 is completely prevented by maintaining the bin shut tight until the substrate S begins to expand (for about 25 days) caused by the spread of hyphae up to the surface of culture medium. When the spreading of the hyphae further progresses and the substrate S begins to expand, culture bin 1 extends with the expansion of mushroom culture medium S; natural culture atmosphere is created thereby. The total period of the culture is about 90 days and the culture bin 1 extends by 1–1.5 cm finally.

Carbon dioxide concentration in culture bin 1 was 4.5% in the culture period, which is significantly reduced when compared with the concentration of 9.6% when conventional culture bins have been used. As for the days required for turning to brown, 50 days are required for the present inventive culture bin 1 while they are 60 days for conventional culture bin; the culture period therefore was shortened as well. As for water content of the culture medium at the end of the culture, the content was 73.5% in culture bin 1 while it was 78.5% in a conventional culture bin improving also the efficiency of evaporating and dissipating water. With 1200 g of substrate S, harvested mushroom was 210.3 g in the culture bin 1 while being 180.4 g in the conventional bin; resulting in increased harvest too.

Figure 4:
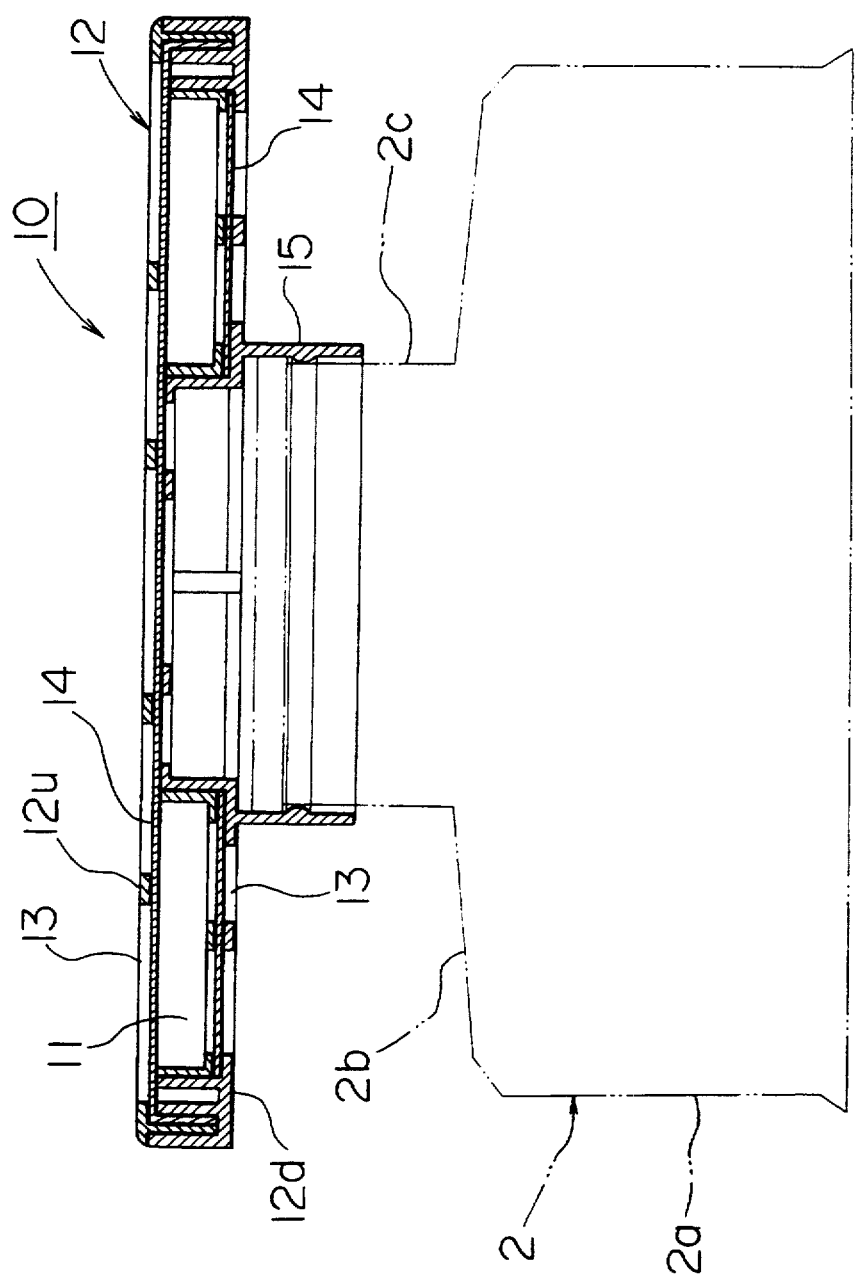
FIG. 4 is a vertical cross section of a cap that is fitted to a bin for mushroom culture according to the present invention.

Also, as an example, cap 10 for fitting to mushroom culture bin 1 is shown in FIG. 4. Internally cap 10 has space 11 for ventilation and is provided with housing part 12 which is flat and has a broader width than bin mouth 2c. Housing part 12 has a broader open area than that of bin mouth 2c due to ventilating windows 13 being provided in lower the surface part 12d and upper surface part 12u. A filter part 14 is also provided that is permeable and blocks the ventilating windows 13. Lower surface park 12d has a fitting part 15 that is attachable and detachable to bin mouth 2c.

Therefore, cap 10 is fitted when the bin mouth 2c communicates with ventilation space 11 made within housing part 12 when bin mouth 2c is fitted with fitting pare 15. Therefore, when carbon dioxide increases in culture bin 1 at the cultivation process, the carbon dioxide goes into the ventilation space 11 of housing part 12 through bin mouth 2c and is exhausted to the outside through permeable filter part 14 and ventilation window 13, in housing part 12, which has a broader open area than the opening of bin mouth 2c, to perform ventilation, where upward and downward paths through upper surface part 12u and lower surface pare 12d respectively secure the passage route for ventilation and carbon dioxide heavier than air is exhausted downward through lower surface part 12d.

While a preferred embodiment has been particularly described in detail, the present invention is not limited to such an embodiment. For example, while shiitake is shown as an exemplary mushroom, the invention can be similarly applied to other mushrooms. In addition, various modifications are applicable within the spirit and scope of the present invention including arrangement of details and shape.

What is claimed is:

1. A bin for mushroom culture comprising: an upper half bin attachable and detachable to a lower half bin for accommodating therein culture medium to cultivate mushrooms, wherein said upper half bin and said lower half bin are capable of elongation and contraction by sliding vertically, at a fitted part of said upper half bin and said lower half bin; and a plurality of linear protrusions are provided at said fitted part of said upper half bin and said lower half bin between said upper half bin and said lower half bin, whereby said fitted part of said upper half bin and said lower half bin is closed tight at the most contracted position and when elongated compared with the most contracted position, a ventilation route in zigzag shape connecting the inside and outside at the fitted part of said upper half bin and said lower half bin, is formed by said plurality of linear protrusions.

2. The bin for mushroom culture according to claim 1 wherein said upper half bin and said lower half bin are formed of synthetic resin containing from 0.1 to 2 weight percent of silicone.

3. The bin for mushroom culture according to claim 2 wherein polypropylene is used as said synthetic resin.

4. The bin for mushroom culture according to claim 1, wherein said plurality of linear protrusions are fabricated onto an outer circumference of said lower half bin.

* * * * *